(12) United States Patent
Lim et al.

(10) Patent No.: US 9,672,423 B2
(45) Date of Patent: Jun. 6, 2017

(54) OBJECT TRACKING APPARATUS AND METHOD THEREOF

(71) Applicants: SAMSUNG ELECTRONICS CO., LTD., Suwon-si (KR); POSTECH ACADEMY-INDUSTRY FOUNDATION, Pohang-si (KR)

(72) Inventors: Tae-gyu Lim, Seoul (KR); Bo-hyung Han, Seoul (KR); Woo-sung Shim, Suwon-si (KR); Su-ha Kwak, Goyang-si (KR); Seung-hoon Hong, Seoul (KR)

(73) Assignees: SAMSUNG ELECTRONICS CO., LTD., Suwon-si (KR); POSTECH ACADEMY-INDUSTRY FOUNDATION, Phang-si (KR)

( * ) Notice: Subject to any disclaimer, the term of this patent is extended or adjusted under 35 U.S.C. 154(b) by 159 days.

(21) Appl. No.: 14/559,098

(22) Filed: Dec. 3, 2014

(65) Prior Publication Data
US 2015/0332093 A1 Nov. 19, 2015

(30) Foreign Application Priority Data
May 15, 2014 (KR) .................. 10-2014-0058319

(51) Int. Cl.
*G06K 9/00* (2006.01)
*G06K 9/62* (2006.01)
*G06T 7/277* (2017.01)

(52) U.S. Cl.
CPC ....... *G06K 9/00624* (2013.01); *G06K 9/6297* (2013.01); *G06T 7/277* (2017.01); *G06T 2207/20076* (2013.01)

(58) Field of Classification Search
None
See application file for complete search history.

(56) References Cited

U.S. PATENT DOCUMENTS

2007/0086622 A1* 4/2007 Sun .................... G06K 9/32
382/103

OTHER PUBLICATIONS

Kwon, Junseok, and Kyoung Mu Lee. "Tracking of abrupt motion using Wang-Landau Monte Carlo estimation." European Conference on Computer Vision. Springer Berlin Heidelberg, 2008.*
Buchanan, Aeron, and Andrew Fitzgibbon. "Interactive feature tracking using kd trees and dynamic programming." 2006 IEEE Computer Society Conference on Computer Vision and Pattern Recognition (CVPR'06). vol. 1. IEEE, 2006.*

* cited by examiner

*Primary Examiner* — Vikkram Bali
*Assistant Examiner* — Tracy Mangialaschi
(74) *Attorney, Agent, or Firm* — Sughrue Mion, PLLC

(57) ABSTRACT

A method of tracking an object of an object tracking apparatus is provided. The method includes by performing probability propagation between a set of frames where tracking of a target object is completed and a set of frames where tracking of a target object is not completed among a plurality of frames of an image, calculating a probability map for a target object in each frame included the set of frames where tracking is completed, selecting a frame form the set of frames where tracking is not completed based on the calculated probability map, and determining a location of the target object in the selected frame.

13 Claims, 9 Drawing Sheets

OBJECT TRACKING APPARATUS AND METHOD THEREOF

CROSS-REFERENCE TO RELATED APPLICATIONS

This application claims priority from Korean Patent Application No. 10-2014-0058319, filed in the Korean Intellectual Property Office on May 15, 2014, the disclosure of which is incorporated herein by reference.

BACKGROUND

1. Field

A method and an apparatus consistent with the exemplary embodiments relate to an object tracking apparatus and a method thereof. In particular, exemplary embodiments relate to an object tracking apparatus which tracks a location of an object in a video frame, and a method thereof.

2. Description of the Related Art

Recently, due to the development of object tracking technologies, various methods of tracking an object in a video have been proposed.

As an example of an existing tracking method, when tracking an object in a plurality of frames constituting a video, many methods of sequentially tracking the object in consecutive frames in a chronological order are available.

Since an object is tracked in a next frame based on a result of tracking the object in the previous frame, if the object to be tracked is covered by another object and is not tracked accurately, the result affects the tracking in the next frame. Therefore, the method as described above may not track an object accurately.

Accordingly, there is a need to be able to track an object in an image in a more accurate manner.

SUMMARY

Aspects of the exemplary embodiments relate to an object tracking apparatus which tracks an object in a specified order from the easiest frame where a tracking operation is to be performed, that is, the frame where the location of a target object is most certain, to the hardest frame where a tracking operation is to be performed among all of the frames regardless of a chronological order of frames, and a method thereof.

According to an exemplary embodiment, a method of tracking an object by an object tracking apparatus comprises performing probability propagation between a set of frames where tracking of a target object is completed and a set of frames where tracking of the target object is not completed among a plurality of frames constituting an image, calculating a probability map for the target object in each frame included in the set of frames where tracking of the target object is completed, selecting a frame from the set of frames where tracking of the target object is not completed based on the calculated probability map, and determining a location of the target object in the selected frame.

According to an aspect of the exemplary embodiment, the method may further comprise updating the set of frames where tracking of the target object is completed by adding the selected frame to the set of frames where tracking is completed, updating the set of frames where tracking is not completed by eliminating the selected frame from the set of frames where tracking is not completed, and calculating a probability map for the target object in each frame included in the updated set of frames where tracking is not completed by performing a patch matching operation between the set of frames where tracking is completed and the set of frames where tracking is not completed.

In addition, the method may further comprise selecting a frame from the updated set of frames where tracking is not completed based on the calculated probability map, and determining a location of the target object in the frame selected from the updated set of frames where tracking is not completed.

Moreover, the selecting may select a frame from the set of frames where tracking is not completed based on a reliability level of the calculated probability map.

Furthermore, the determining a location of a target object may determine a point which has a maximum probability in the calculated probability map, and determine the determined point to be a location of the target object in the selected frame.

According to an aspect of the exemplary embodiment, an object tracking apparatus comprises a probability map calculation device configured to calculate a probability map for the target object in each frame included in the set of frames where tracking is not completed by performing probability propagation between a set of frames where tracking of a target object is completed and a set of frames where tracking of a target object is not completed among a plurality of frames constituting an image, a frame selection device configured to select a frame from the set of frames where tracking is not completed based on the calculated probability map, and a location determination device configured to determine a location of the target object in the selected frame.

According to an aspect of the exemplary embodiment, the frame selection device updates the set of frames where tracking is completed by adding the selected frame to the set of frames where tracking is completed, and may update the set of frames where tracking is not completed by eliminating the selected frame from the set of frames where tracking is not completed, and the probability map calculation device calculates a probability map for the target object in each frame included in the updated set of frames where tracking is not completed by performing a patch matching operation between the updated set of frames where tracking is completed and the updated set of frames where tracking is not completed.

According to the exemplary embodiment, the frame selection device selects a frame from the updated set of frames where tracking is not completed based on the calculated probability map, and the location determination device determines a location of the target object in the frame selected from the updated set of frames where tracking is not completed.

According to an aspect of the exemplary embodiment, the frame selection device may select a frame from the set of frames where tracking is not completed based on a reliability level of the calculated probability map.

According to another aspect of the exemplary embodiment, the location determination device may determine a point which has a maximum probability in the calculated probability map, and determine the determined point to be a location of the target object in the selected frame.

According to the above-described various exemplary embodiments, an object the user wants to track may be tracked more accurately.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE PREFERRED EMBODIMENT

Hereinafter, exemplary embodiments will be described in detail with reference to the accompanying drawings.

Figure 1:
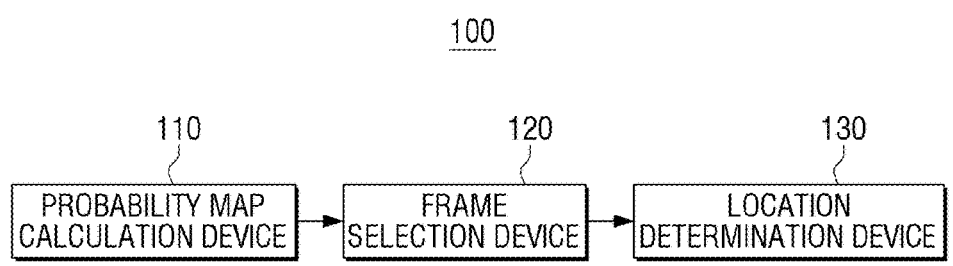
FIG. 1 is a block diagram illustrating a configuration of an object tracking apparatus according to an exemplary embodiment.

FIG. 1 is a block diagram illustrating a configuration of an object tracking apparatus according to an exemplary embodiment. Referring to FIG. 1, the object tracking apparatus 100 includes a probability map calculation device 110, a frame selection device 120, and a location determination device 130.

Before explaining each element of a configuration shown in FIG. 1, an algorithm used to determine a location of a target object to be tracked in a plurality of frames will be explained.

Figure 2:
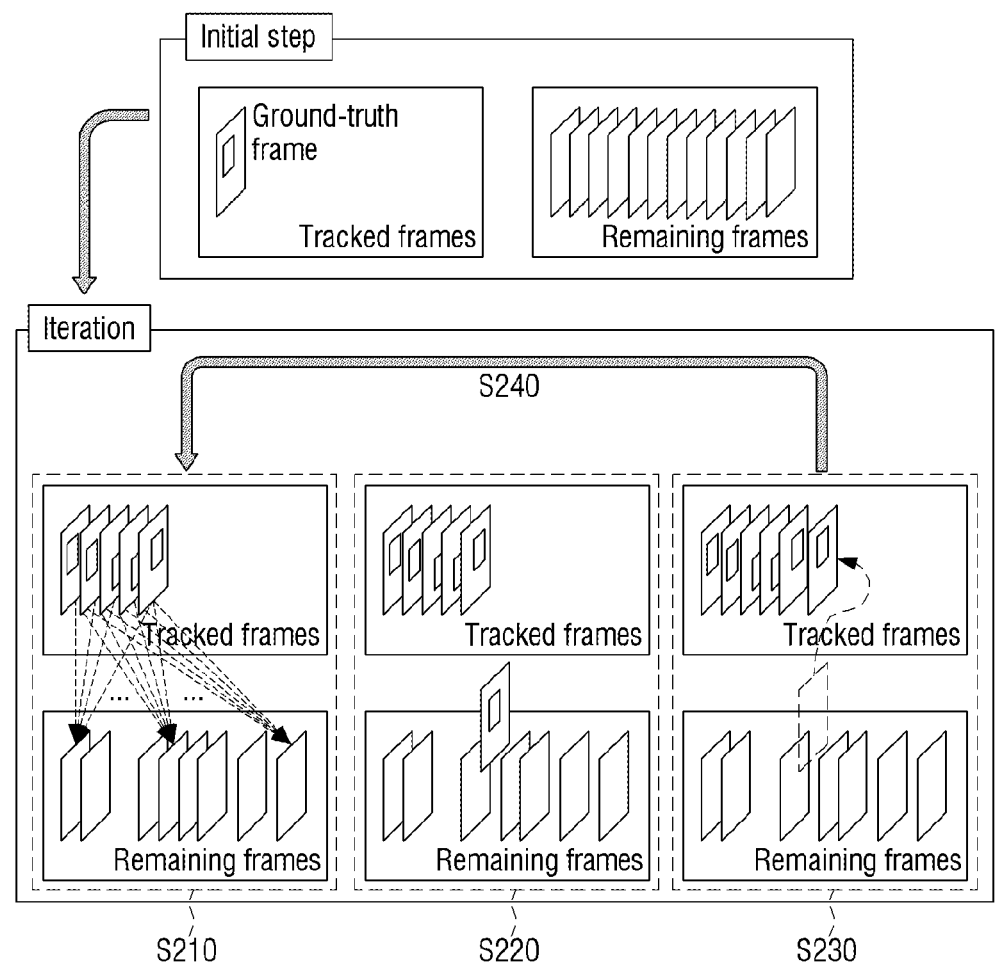
FIG. 2 is a view illustrating a flow of a method of tracking an object according to an exemplary embodiment.

In the exemplary embodiment, when tracking a target object in each frame of an image constituted with the N number of frames, a location of the target object is determined in an order from the easiest frame where the object can be tracked, that is, a location where a target object is most likely to be found, to the hardest frame where the object may be tracked among the entire N number of frames, that is, the frame where the location of the object is less certain to be found. Hereinafter, this will be explained in more detail with reference to FIG. 2.

If an index set of whole frames is $F=\{1, 2, \ldots, N\}$, F in the $K^{th}$ tracking step may be expressed as $F=T_k \cup R_k$. In this regard, $T_k$ may be shown as $T_k=\{t_1, \ldots, t_k\}$ as an index set of frames where tracking is completed, and $R_k$ may be shown as $R_k=F\backslash T_k=\{r_1, \ldots, r_{N-k}\}$ as an index set of the remaining frames, that is, the frames where tracking is not completed (or, frames where tracking has not yet started).

In a case like this, the $k+1^{th}$ tracking step may be performed as shown below.

1) $P(x_i)$ and $\forall \in R_k$, a probability map for the remaining frames, are calculated from $P(x_t)$ and $\forall t \in T_k$, a probability map for frames where tracking is completed, 2) Determine uncertainty of each of the probability maps $P(x_i)$, and $\forall i \in R_k$, and set a frame having a probability map of minimum uncertainty as an index of frame $t_{k+1}$ (operation S220).

3) Update the set of frames where tracking is completed and the set of the remaining frames respectively by using $T_{k+1}=T_k \cup \{t_{k+1}\}$ and $R_{k+1}=R_k\backslash\{t_{k+1}\}$, and based on a probability map of a frame where an index of the frame is $t_{k+1}$, determine a location of a target object to be track in the corresponding frame (operation S230).

4) Repeat the above-described processes until $T_N=F$ and $R_N=v$ are established. (operation S240).

For instance, in case of the $K+2^{th}$ tracking step, by using each probability for frames included in the updated set of frames where tracking is completed, calculate probability maps $P(x_i)$ and $\forall i \in R_{k+1}$ for the remaining frames where tracking is not completed, and based on a reliability of each of the calculated probability maps, set a frame having a probability map of minimum uncertainty as an index of the frame $t_{k+2}$.

Subsequently, an update the set of frames where tracking is completed and the set of the remaining frames where tracking is not completed is respectively made by using the formulas $T_{k+2}=T_k \cup \{t_{k+2}\}$ and $R_{k+2}=R_k\backslash\{t_{k+2}\}$, and based on a probability map for a frame where an index of the frame is $t_{k+2}$, to determine a location of a target object to be tracked in the frame where tracking is not completed.

In the end, by repeating the above-described processes until $T_N=F$ and $R_N=v$ are established, determine a location of a target object to be tracked in all frames.

Hereinafter, motions performed in each element of an object tracking apparatus 100 for tracking an object according to the above-described method will be explained in detail with reference to FIG. 1.

However, an image used for tracking in the exemplary embodiments may be pre-stored in the object tracking apparatus 100, and accordingly, the object tracking apparatus 100 may be equipped with a storage medium such as a memory (not shown).

By performing probability propagation between a set of frames where tracking of a target object is completed and a set of frames where tracking of a target object is not completed among a plurality of frames constituting an image, a probability map calculation device 110 calculates a probability map for the target object in each frame included in the set of frames where tracking is not completed.

Herein, the set of frames where tracking is completed is composed of frames where a location of a target object to be tracked is determined, and a frame where tracking is completed first in the corresponding set of frames may be a frame where a target object is set by a user command.

The object tracking apparatus 100 may be embodied as an input means (not shown), for example, a user input unit such as a button, an input pad or a remote controller, but not limited thereto, which receives a user command to set a target object in a frame, and as a display (not shown) for displaying a plurality of frames constituting an image. The display apparatus may include for example, a mobile device, a personal computer (PC), a computer, a television (TV) connectable to a wired/wireless network, i.e., an Internet protocol TV or a digital multimedia broadcasting terminal, or like device, which can receive and reproduce broadcast signals. The mobile device may be a mobile device such as a cellular phone, a smart phone, a personal digital assistant (PDA), a portable multi-media player (PMP), and a navigation device.

Figure 3:
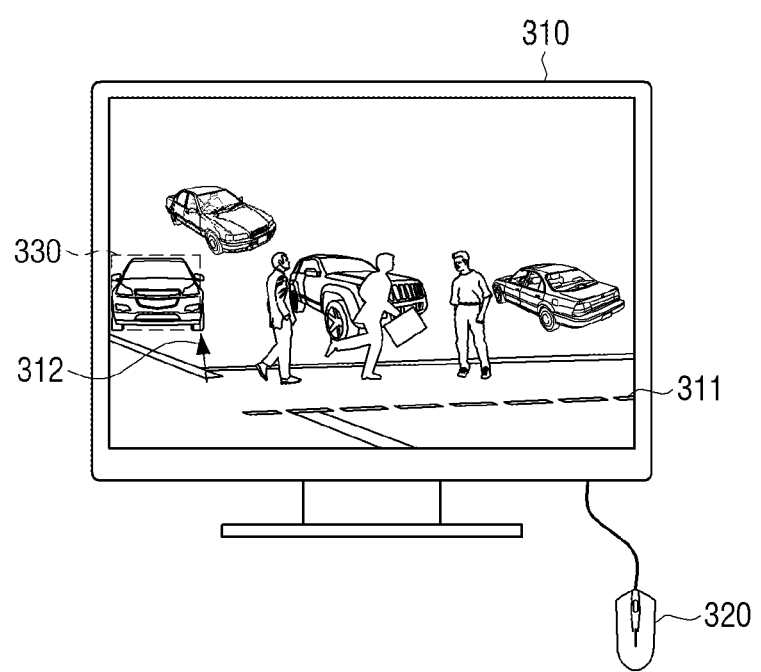
FIG. 3 is a view illustrating a method of setting an object which a user wants to track according to an exemplary embodiment.

For example, as illustrated in FIG. 3, a display 310 may display a frame 311 selected by a user from a plurality of frames constituting an image, and a cursor 312 for selecting a particular area in the frame. Herein, movements of the cursor and a particular area selection of the cursor 312 may be controlled by a mouse 320.

Accordingly, a user may select a particular area in a frame by using the mouse 320, and may select a target object 330 to be tracked in a frame.

Thus, since a target object is set by a user command, and a location of the target object is determined in the corresponding frame, the frame where a target object is set by the user command may be a frame where tracking is completed initially. In this regard, the probability map calculation device 110 may calculate a probability map for the target object in the remaining frames based on the determined location of the target object in the corresponding frame.

Hereinafter, a process in which the probability map calculation device 110 calculates a probability map for the target object in each of the remaining frames through probability propagation will be explained in more detail. However, hereinafter, it is assumed that tracking the k−1$^{th}$ number of frames is completed based on the initial frame and the probability map for the target object is determined in a frame where tracking will be completed in the k$^{th}$ frame in the order in the k$^{th}$ tracking step (hereinafter, the k$^{th}$ frame (or frame $t_k$)).

However, in the exemplary embodiments, since an object tracking is performed in an order from the easiest frame to be tracked to the hardest frame to be tracked, and is not performed in a chronological order, a model of tracking an object using frames which are located close in terms of time cannot be assumed.

Generally, in the Bayesian framework, relations between frames are modeled by the first order Markov chain since tracking an object is performed where frames which are arranged in close proximity with regard to time are directly correlated.

However, in the exemplary embodiments, a number of paths may exist from a starting frame where a location of a target object is known to a frame to be tracked since a chronological order of frames is not considered when tracking the object.

For example, in response to the k−1$^{th}$ number of frames where tracking is completed and the frames constituting a set of frames $T_{k-1}$, a path generated by a subset S of the frames included in $T_{k-1}$ should be passed through to reach the k$^{th}$ frame (that is, a target frame) from a starting frame. In other words, as many paths exists as the number of all possible subset S.

In this regard, each path from the starting frame to the k$^{th}$ frame may be modeled by the first order Markov chain, and may be shown as a chain model such as $\Psi_S$ ($S \subseteq T_k$).

Thus, since a plurality of paths to reach a target frame from a starting frame exists and each of the paths is modeled as a chain model, a probability map for a target frame may be calculated considering all possible models.

Specifically, the probability map for the target frame may be calculated based on an average value for the calculated probability map for all possible models by using the Bayesian model averaging described in "J. A. Hoeting, D. Madigan, A. E. Raftery and C. T. Volinsky. Bayesian model averaging: A tutorial. Statistical Science, 14(4), 1999."

Figure 4A:
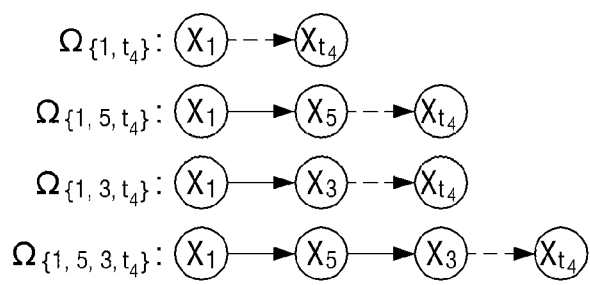
FIGS. 4A and 4B are views illustrating a method of calculating a probability map according to an exemplary embodiment.
Figure 4B:
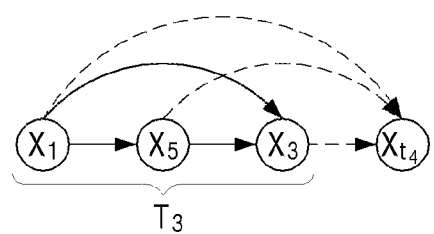

For example, it is assumed that k=4, $T_3=\{1,5,3\}$, and tracking is performed for frame $t_4$ in the 4$^{th}$ tracking step. In this regard, as shown in FIG. 4A, four types of paths may exist to reach frame $t_4$ from a starting frame. Accordingly, as shown in FIG. 4B, a probability map for the 4$^{th}$ frame may be calculated through an average of four chain models.

That is, assuming that an index of a frame selected for tracking in the k$^{th}$ tracking step is $t_k$, the probability map calculation device 110 may calculate all chain models which have the frame $t_k$ as the last node, and may calculate a probability map $\tilde{P}(x_{t_k})$ for frame $t_k$ by an average value of a probability map for a location of the target calculated according to each chain model.

In this case, the probability map $\tilde{P}(x_{t_k})$ may be represented as mathematical formula 1. That is, the probability map calculation device 110 may calculate a probability map for the target object in frame $t_k$ included in a set of the remaining frames based on mathematical formula 1.

$$\tilde{P}(x_{t_k}) \propto P(p_{t \to t_k}) \sum_{t \in T_{k-1}} P(z_{t_k} | x_{t_k}) \int P(x_{t_k} | x_t) \tilde{P}(x_t) dx_t \quad \text{[Mathematical formula 1]}$$

Herein, $t \in T_k$ refers to a random frame tracked prior to the k$^{th}$ tracking step, and $Z_{t_k}$ is an observation variable of frame $t_k$. In addition, a probability map is expressed as $\tilde{P}$ to write a notation simply.

In addition, by taking all possible t into account, it may be figured out that an average for all chain models reaching a frame t is calculated in mathematical formula 1.

Hereinafter, a method of drawing mathematical formula 1 will be explained in detail.

First of all, assuming that a subset of $T_{k-1}$ which has $t \in T_{k-1}$ as the last element is $S_t$, a probability map of $x_t$ may be expressed as mathematical formula 2 by the Bayesian model averaging.

$$\tilde{P}(x_t) = \sum_{S_t \subseteq T_{k-1}} P(x_t | \Omega_{S_t}, Z_{S_t}) P(\Omega_{S_t}) \quad \text{[Mathematical formula 2]}$$

Herein, $Z_{S_t}$ refers to an observation variable corresponding to a frame in $S_t$, and $\Omega_{S_t}$ refers to a candidate chain model provided by $S_t$. In addition, $P(\Omega_{S_t})$ refers to a model prior corresponding to $S_t$.

However, a chain model which passes through frame t as the last frame and reaches frame $t_k$ may be shown as mathematical formula 3. [Mathematical formula 3]

$$\Omega_{S_t \cup \{t_k\}} = \langle \Omega_{S_t}, p_{t \to t_k} \rangle$$

Herein, $p_{t \to t_k}$ refers to a path from the last node to frame $t_k$ in $\Omega_{S_t}$, that is, a path from frame t to frame $t_k$.

$\langle \Omega_{S_t}, p_{t \to t_k} \rangle$ refers to a concatenation calculation between the two paths.

In other words, a path from a starting frame to frame $t_k$ is the same as connecting a path from the starting frame to frame t and a path from frame t to frame $t_k$.

In this regard, since mathematical formula 2 may be expressed as $P(\langle \Omega_{S_t}, p_{t \to t_k} \rangle) = P(\Omega_{S_t}) P(p_{t \to t_k})$ stochastically, mathematical formula 2 may be described as mathematical formula 4.

$$\tilde{P}(x_{t_k}) = \sum_{t \in T_{k-1}} \sum_{S_t \subseteq T_{k-1}} P(x_{t_k} | \Omega_{S_t \cup \{t_k\}}, Z_{S_t \cup \{t_k\}}) P(\Omega_{S_t \cup \{t_k\}}) \quad \text{[Mathematical formula 4]}$$

-continued $$= \sum_{t \in \mathcal{T}_{k-1}} P(p_{t \to t_k}) \sum_{S_t \subseteq \mathcal{T}_{k-1}} P(x_{t_k} | \Omega_{S_t} \cup \{t_k\}, Z_{S_t \cup \{t_k\}}) P(\Omega_{S_t})$$

However, since each chain model is modeled by the first order Markov chain, mathematical formula 4 may be expressed as mathematical formula 6 by using the Bayes' theorem as mathematical formula 5.

$$\tilde{P}(x_t | \Omega_{S_t \cup \{t_k\}}, Z_{S_t \cup \{t_k\}}) \propto \quad \text{[Mathematical formula 5]}$$
$$\int P(Z_{t_k} | x_{t_k}) P(x_{t_k} | x_t) P(x_t | \Omega_{S_t}, Z_{S_t}) dx_t$$

$$\tilde{P}(x_{t_k}) \propto \quad \text{[Mathematical formula 6]}$$
$$\sum_{t \in \mathcal{T}_{k-1}} P(p_{t \to t_k}) \sum_{S_t \subseteq \mathcal{T}_{k-1}} P(\Omega_{S_t}) \times \left\{ \int P(Z_{t_k} | x_{t_k}) P(x_{t_k} | x_t) P(x_t | \Omega_{S_t}, Z_{S_t}) dx_t \right\}, =$$
$$\sum_{t \in \mathcal{T}_{k-1}} P(p_{t \to t_k}) \int P(Z_{t_k} | x_{t_k}) P(x_{t_k} | x_t) \times \left\{ \sum_{S_t \subseteq \mathcal{T}_{k-1}} P(\Omega_{S_t}) P(x_t | \Omega_{S_t}, Z_{S_t}) \right\} dx_t$$

However, since $$\left\{ \sum_{S_t \subseteq \mathcal{T}_{k-1}} P(\Omega_{S_t}) P(x_t | \Omega_{S_t}, Z_{S_t}) \right\} dx_t$$

in mathematical formula 6 is the same as mathematical formula 2. $\tilde{P}(x_{t_k})$ may be expressed as mathematical formula 7.

$$\tilde{P}(x_{t_k}) \propto \sum_{t \in \mathcal{T}_{k-1}} P(p_{t \to t_k}) \quad \text{[Mathematical formula 7]}$$
$$P(Z_{t_k} | x_{t_k}) \int P(x_{t_k} | x_t) \tilde{P}(x_t) dx_t$$

Accordingly, a probability map for a frame tracked in the $k^{th}$ tracking step may be defined.

However, referring to mathematical formula 1, mathematical formula 1 has a similar form as the related art sequential Bayesian filtering (such as a particle filter).

In particular, a mathematical formula in a summation calculation in mathematical formula 1 corresponds to a probability propagation model in the sequential Bayesian filtering. In other words, the mathematical formula in mathematical formula 1 refers to probability propagation (that is, density propagation) from frame t which satisfies $t \in \mathcal{T}_{k-1}$ to frame $t_k$, and it corresponds to propagating a probability map from frame t where tracking is completed to frame $t_k$ where tracking is not completed.

Accordingly, the probability map calculation device 110 may calculate a probability map for the target object in frame $t_k$ where tracking is not completed by propagating a probability from the k−1 number of frames to frame $t_k$ where tracking is not completed based on mathematical formula 1.

Thus, the probability map calculation device 110 may calculate a probability map for a target object in each frame where tracking is not completed by performing probability propagation between a set of frames where tracking is completed and a set of frames where tracking is not completed.

Hereinafter, an explanation will be made in detail with regard to the manner in which a frame, among frames where a probability is propagated, is selected and added to a set of frames where tracking is completed based on a calculated probability map.

As described above, in the exemplary embodiment, a probability map for a frame where tracking is not completed is calculated by propagating a probability for a target object from a frame where tracking is completed to the frame where tracking is not completed, and adding one of the frames selected from the set of frames where tracking is not completed to the set of frames where tracking of the target object is completed by selecting one of the frames where tracking is not completed based on the calculated probability map.

Accordingly, a particular frame should be selected from the frames where a probability map is calculated in order to add the selected frame to the set of frames where tracking of the target object is completed.

In this case, in response to the selected frame being added to the set of frames where tracking is completed, a probability map for the added frame is not changed, and frames in the set of frames where tracking is completed are used to calculate a probability map for the frames where tracking is not completed, and accordingly, calculating a probability map for other frames may be affected in a negative way in response to a frame having an uncertain probability map being added to the set of frames where tracking is completed.

Accordingly, selecting a frame to add to the set of frames where tracking is completed may be an important process.

The frame selection device 120 selects a frame from a set of frames where tracking is not completed based on a calculated probability map.

Specifically, the frame selection device 120 may calculate reliability of the probability map and may select a frame from the set of frames where tracking is not completed based on the calculated reliability of the probability map.

The frame selection device 120 may update the set of frames where tracking is completed and the set of frames where tracking is not completed based on the selected frame. In other words, the frame selection device 120 may update each of the sets of frames where tracking is completed and each of the set of frames where tracking is not completed by adding the selected frame to the set of frames where tracking is completed and by eliminating the selected frame from the set of frames where tracking is not completed.

The location determination device 130 determines a location of a target object in the selected frame. Specifically, the location determination device 130 may determine a point having a maximum probability in the calculated probability map and determine the determined point as a point where the target object exists in the selected frame (such as frame $t_k$).

Hereinafter, an explanation will be given with regard to how the frame selection device 120 and the location determination device 130 select a frame from a set of frames where tracking is not completed based on the reliability of a calculated probability map, and determine a location of a target object with reference to FIG. 5.

Figure 5:
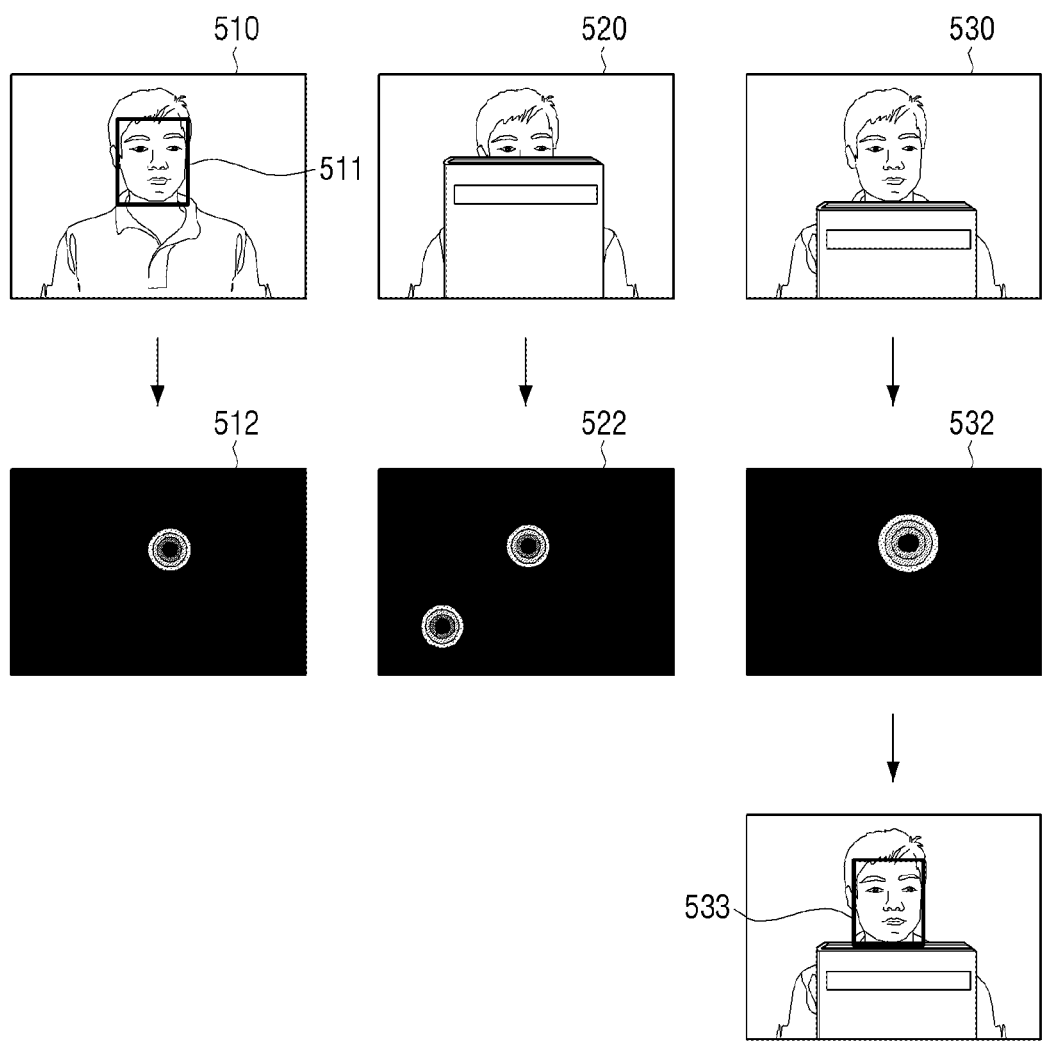
FIG. 5 is a view illustrating a method of selecting a frame from a set of frames not tracked and determining a location of a target object in the selected frame according to an exemplary embodiment.

In FIG. 5, a frame 510 may comprise a set of frames where tracking is completed. For example, frame 510 represents frames where tracking of a target object 511 is completed. Frames 520 and 530 may comprise a set of frames where tracking of a target object is not completed.

In this regard, in response to a calculated probability map for the target object 511 in the frame 510 being the same as a probability map 512, and in response to probability propagation being performed between the frame 510 and frames 520 and 530 to calculate a probability map for a target object, a probability map for the target object in the frame 520 may be indicated as a probability map 522, and a probability map for the target object in the frame 530 may be indicated as a probability map 532.

Since an area shown in a contour form (that is, the Gaussian form) shows a probability in which the target object 511 exists in the frames 520 and 530, it may be assumed that a probability map having probability distribution in a lower number of points among the probability maps 522 and 532, has a low reliability, and a probability map having a probability distribution in a lower number of points and having an area with a relatively high probability among the probability maps 522 and 532 has a higher reliability.

Accordingly, the frame selection device 120 may select a frame from the set of frames where tracking is not completed based on a reliability of the calculated probability map, and may update the set of frames where tracking is completed and the set of frames where tracking is not completed respectively based on the selected frame.

In the above example, the frame selection device 120 may select the frame 530 which has a higher reliability, that is, a frame associated with a probability map in which a probability is distributed over the relatively lower number of points and an area having a relatively high probability exists, may add the frame 530 to the set of frames where tracking is completed, and may eliminate the frame 530 from the set of frames where tracking is not completed. Accordingly, the set of frames where tracking is completed may be composed of the frames 510 and 530, and the set of frames where tracking is not completed may be composed of the frame 520.

In this regard, the location determination device 130 may determine a point having a maximum probability in the selected frame to be a location of a target object. In the above-described example, the location determination device 130 may determine that the target object exists in a point 533 having the highest probability in the frame 530.

However, the frame selection device 120 may update the set of frames where tracking is completed by adding the selected frame to the set of frames where tracking is completed, and may update the set of frames where tracking is not completed by eliminating the selected frame from the set of frames where tracking is not completed.

For example, assuming that all sets of frames is F, a set of frames where tracking is completed and a set of frames where tracking is not completed in the k–1$^{th}$ tracking step may be expressed as $T_{k-1} = \{t_1, \ldots, t_{k-1}\}$, and $R_{k-1} = F \backslash T_{k-1}$, respectively.

In this case, the frame selection device 130 may update the sets of frames respectively by selecting frame $t_k$ in the k$^{th}$ tracking step and adding selected frame $t_k$ to the set of frames where tracking is completed, and by eliminating selected frame $t_k$ from the set of frames where tracking is not completed.

Thus, in response to the sets of frames being updated, the probability map calculation device 110 may calculate a probability map for a target object in each frame included in the updated set of frames where tracking is completed and the updated set of frames where tracking is not completed by performing probability propagation between the updated set of frames where tracking is updated and the updated set of frames where tracking is not updated. In this case, the probability map calculation device 110 may calculate a probability map based on mathematical formula 1.

Subsequently, the location determination device 130 may determine a location of the target object in the frame selected from the set of frames where tracking is not completed based on the calculated probability map. In this case, the frame selection device 130 may determine a location of the target object in the selected frame based on reliability of the calculated probability map.

In the end, the probability map calculation device 110, the frame selection device 120, and the location determination device 130 repeat the above-described processes until the location of the target object is determined in all of the frames where tracking is not completed.

Hereinafter, effects of the method of tracking an object will be explained in comparison with the existing different tracking methods.

However, an image which is tracked by a tracking apparatus may be an image which is frequently used for verifying performance or direction of an object, such as an animal in motion, a tennis ball or the individuals involved in a tennis match, a TUD, an individual on a campus, the cars involved in an accident, and the competitors in a boxing match, and youngki.

Among these images or target objects, an image of the animal is an image of a fast-moving object, and the motion of the animal may be blurred. The image of the movement of a tennis ball, or the images of the individuals involved in a tennis match are unpredictable and fast-moving objects, since it is encoded at a low frame rate. In addition, images of the TUD, the individuals on the campus, and the images of cars involved in an accident may include areas where the target object is covered by another object.

FIG. 6 illustrates an order of frames where a location of a target object is determined based on a method of tracking an object according to an exemplary embodiment.

Figure 6A:
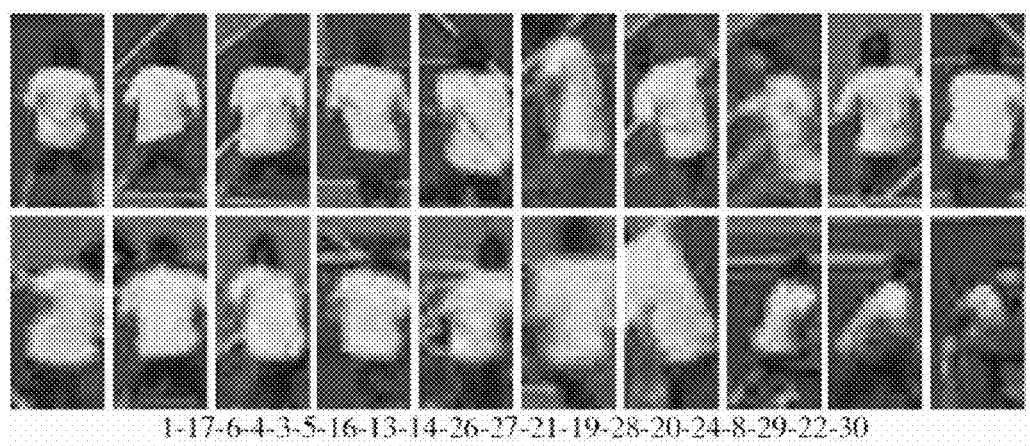
FIGS. 6A and 6B are views illustrating an order of frames tracked in a method of tracking an object according to an exemplary embodiment.
Figure 6B:

Specifically, FIG. 6A shows a result of tracking an object in the image of a tennis match, and FIG. 6B shows a result of tracking an object in an image of boxing match. Numbers in FIG. 6 indicate an index of each frame.

Referring to FIG. 6A, according to the method of tracking an object, tracking is performed in an order from the easiest frame to track the object to the hardest frame to track the object by exploring the entire image. That is, tracking of the object is performed according to the changing order of the frames with reference to a target object which is set initially.

However, Table 1 and Table 2 as shown below show results of a comparison between the performance of the related art methods of tracking an object and the performance of the method of tracking an object in the present exemplary embodiment.

TABLE 1

Average center location error (in pixels). underline: best, italics: second best

|  | IVT | MIL | SCM | L1APG | ASLSA | L1 | FRAG | WLMC | OTLE | OMA | SMA |
|---|---|---|---|---|---|---|---|---|---|---|---|
| animal | 10.6 | 32.0 | 16.6 | 48.8 | 179.6 | 164.9 | 94.1 | 64.8 | 19.4 | *7.7* | <u>7.4</u> |
| TUD | 12.6 | 57.1 | 12.2 | 7.4 | 67.2 | 64.7 | 17.3 | 68.2 | 27.4 | <u>4.4</u> | *5.9* |
| campus | 38.7 | 37.1 | 12.2 | 16.1 | 12.2 | 68.4 | *3.3* | 13.5 | 5.8 | <u>3.2</u> | 7.0 |
| accident | 27.6 | 24.8 | 3.0 | 20.3 | *2.9* | 32.4 | 7.4 | 12.2 | 9.1 | <u>2.6</u> | 6.5 |
| tennis | 68.7 | 74.4 | 65.9 | 85.0 | 68.8 | 111.4 | 67.4 | 31.0 | 37.0 | <u>6.9</u> | *11.9* |
| boxing | 128.1 | 88.9 | 96.0 | 117.6 | 106.8 | 103.5 | 80.0 | 11.7 | 41.7 | <u>10.5</u> | 22.6 |
| youngki | 95.2 | 115.2 | 115 | 137.9 | 151.8 | 121.8 | 97.5 | 16.0 | 15.7 | *11.4* | 14.0 |

TABLE 2

Average overlap ratio. underline: best, italics: second best

|  | IVT | MIL | SCM | L1APG | ASLSA | L1 | FRAG | WLMC | OTLE | OMA | SMA |
|---|---|---|---|---|---|---|---|---|---|---|---|
| animal | *0.60* | 0.42 | 0.55 | 0.4 | 0.04 | 0.04 | 0.08 | 0.31 | 0.48 | <u>0.71</u> | <u>0.71</u> |
| TUD | 0.65 | 0.34 | 0.67 | <u>0.85</u> | 0.32 | 0.62 | 0.59 | 0.38 | 0.48 | *0.82* | 0.75 |
| campus | 0.56 | 0.45 | 0.62 | 0.52 | 0.63 | 0.01 | *0.77* | 0.52 | 0.72 | <u>0.78</u> | 0.67 |
| accident | 0.58 | 0.53 | <u>0.87</u> | 0.69 | 0.84 | 0.45 | 0.60 | 0.57 | 0.59 | *0.85* | 0.76 |
| tennis | 0.06 | 0.20 | 0.11 | 0.29 | 0.12 | 0.03 | 0.11 | 0.43 | 0.31 | <u>0.63</u> | *0.56* |
| boxing | 0.05 | 0.06 | 0.13 | 0.13 | 0.11 | 0.16 | 0.22 | *0.65* | 0.38 | <u>0.70</u> | 0.51 |
| youngki | 0.09 | 0.13 | 0.13 | 0.02 | 0.06 | 0.02 | 0.19 | <u>0.62</u> | *0.54* | <u>0.62</u> | *0.54* |

Herein, the existing tracking methods are 1) L1 which is written in "X. Mei and H. Ling. Robust visual tracking using 11 minimization. In ICCV, 2009", 2) L1-APG which is written in "C. Bao, Y. Wu, H. Ling, and H. Ji. Real time robust 11 tracker using accelerated proximal gradient approach. In CVPR, 2012", 3) SCM written in "W. Zhong, H. Lu, and M.-H. Yang. Robust object tracking via sparsity-based collaborative model. In CVPR, 2012", 4) ASLSA written in "X. Jia, H. Lu, and M.-H. Yang. Visual tracking via adaptive structural local sparse appearance model. In CVPR, 2012.", 5) MTT written in "T. Zhang, B. Ghanem, S. Liu, and N. Ahuja. Robust visual tracking via multi-task sparse learning. In CVPR, 2012", 6) MIL written in "B. Babenko, M.-H. Yang, and S. Belongie. Robust object tracking with online multiple instance learning. TPAMI, 33(8), 2011.", 7) IVT written in "D. A. Ross, J. Lim, R.-S. Lin, and M.-H. Yang. Incremental learning for robust visual tracking. IJCV, 77(1-3), 2008", 8) FRAG written in "A. Adam, E. Rivlin, and I. Shimshoni. Robust fragments-based tracking using the integral histogram. In CVPR, 2006", 9) WLMC written in "J. Kwon and K. M. Lee. Tracking of abrupt motion using Wang-Landau monte carlo estimation. In ECCV, 2008.", and 10) OTLE written in "S. Gu, Y. Zheng, and C. Tomasi. Linear time offline tracking and lower envelope algorithms. In ICCV, 2011."

However, in order to evaluate the performances of the tracking methods, two types of figures generally used for evaluating a tracking method are used.

1) An overlap ratio indicates an area overlapped between bounding box $B^G$ of an original target object and bounding box $B^I$ of a target object found by a tracking apparatus, and it may be represented as mathematical formula 8.

$$\text{overlap}(B^G, B^I) = \frac{B^G \cap B^I}{B^G \cup B^I} \quad \text{[Mathematical formula 8]}$$

2) A center location error may be acquired by calculating a distance between a central point of bounding box $B^G$ and a central point of bounding box $B^I$. In this regard, according to the method of tracking an object, an 8×8 size patch is used for patch matching, 9 scales from 0.6 to 1.4 are used, and 900 samples are used for sampling for all sequences.

Patch matching is an algorithm which quickly finds correspondences between small square regions (or patches) of an image.

However, the object tracking method of the present exemplary embodiments is expressed as OMA in Table 1 and Table 2. Referring to Table 1 and Table 2, the method of tracking an object performs tracking of motions more accurately in response to an object being covered or the motion of an image being changed rapidly, compared to related art methods.

However, in case of the WLMC method, which is a tracking method optimized for responding to an object being changed rapidly, the WLMC method works well for an image having such a characteristic, but the WLMC method does not respond well to an object which is covered, and in case of the OTLE, the OTLE does not work well compared with the method of tracking an object of the exemplary embodiments, and the other related art methods also show low performance in response when the motion of an image is changed rapidly.

Figure 7:
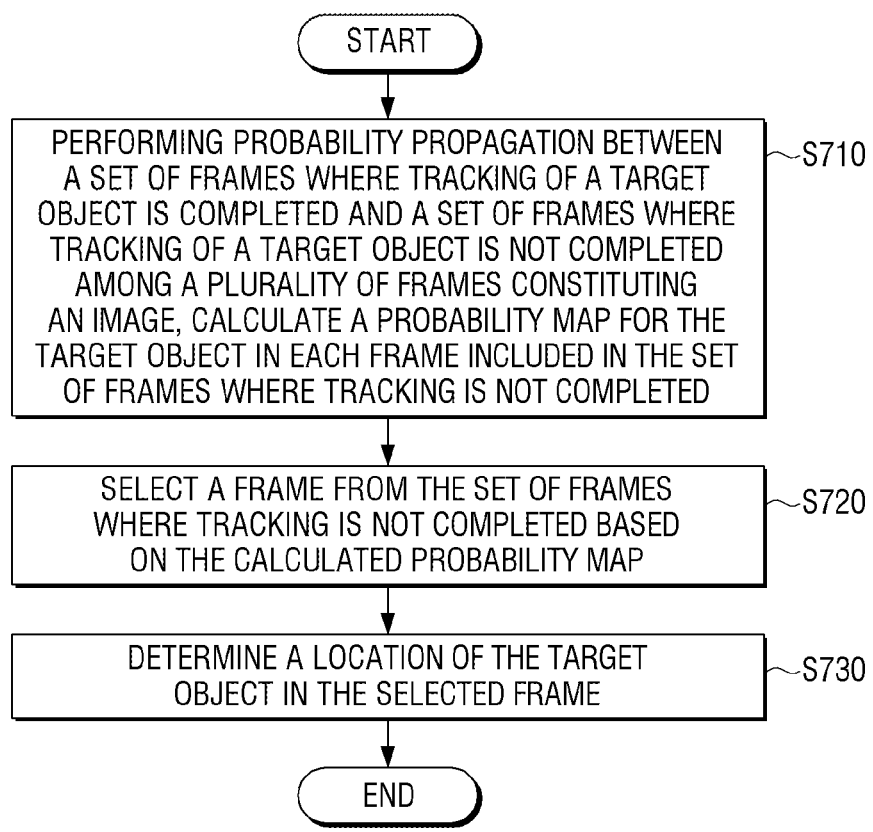
FIG. 7 is a flowchart illustrating a method of tracking an object according to an exemplary embodiment.

FIG. 7 is a flowchart illustrating a method of tracking an object by an object tracking apparatus according to an exemplary embodiment.

Probability propagation is performed between a set of frames where tracking of a target object is completed and a set of frames where tracking of a target object is not completed among a plurality of frames constituting an image. A probability map is calculated for the target object in each frame included in the set of frames where tracking is not completed (operation S710).

Subsequently, a frame is selected from the set of frames where tracking of the object is not completed based on the calculated probability map (operation S720), and a location of the target object is determined in the selected frame (operation S730).

In this regard, the method of tracking an object according to the exemplary embodiment, by updating the set of frames where tracking is completed by adding the selected frame to the set of frames where tracking is completed, and by updating the set of frames where tracking is not completed by eliminating the selected frame from the set of frames where tracking is not completed, and by performing patch matching between the updated set of frames where tracking is completed and the updated set of frames where tracking is not completed, a probability map for the target object may be calculated in each frame included in the updated set of frames where tracking is not completed.

In addition, a method of tracking an object of the exemplary embodiment may select a frame from the updated set of frames where tracking is not completed based on the calculated probability map, and determine a location of the target object in the frame selected from the updated set of frames where tracking is not completed.

Operation S720 may select a frame from a set of frames where tracking is not completed based on reliability of the calculated probability map.

In addition, operation S730 may determine a point having a maximum probability in the calculated probability map, and determine the determined point to be a location of a target object in the selected frame.

A method of calculating a probability map for each frame included in a set of frames where tracking is not completed, a method of selecting a frame from the set of frames where tracking is not completed based on the calculated probability map, a method of determining a location of a target object in the selected frame, and a method of updating a set of frames where tracking is completed and the set of frames where tracking is not completed by using the selected frame are described in detail above.

However, a non-transitory computer readable medium which stores a program performing the method of tracking an object in order may be provided.

The non-transitory readable medium does not refer to a medium storing data for a short moment such as a register, a cache, or a memory, but refers to a medium which stores data semi-permanently and reads the data by an apparatus. Specifically, the above-described various types of applications or programs may be stored in the non-transitory readable medium such as a compact disc (CD), a digital versatile disk (DVD), a hard disk, a Blu-ray disk, a universal serial bus (USB), a memory card, and a read only memory (ROM).

Furthermore, a bus is not shown in the above-described block diagram illustrating the object tracking apparatus, but communication between each element in the object tracking apparatus may be performed through a bus. In addition, processes such as a central processing unit (CPU) and a micro-processor which perform the above-described various steps may be further included in the object tracking apparatus.

The foregoing exemplary embodiments are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of tracking an object, the method comprising:
performing, by a processor, propagation of probability from a first set of frames comprising a part of a plurality of frames where tracking of a target object is completed, among the plurality of frames to a second set of frames comprising remaining frames where the tracking of the target object is not completed to calculate a probability map for the target object in each frame of the second set of frames where the tracking of the target object is not completed;
selecting, by the processor, a frame from the second set of frames where the tracking of the target object is not completed based on a reliability level of the calculated probability map for the selected frame; and
determining, by the processor, a location of the target object in the selected frame,
wherein the part of the plurality of frames where the tracking of the target object is completed comprises the frames where the location of the target object is determined, and the remaining frames where the tracking of the target object is not completed comprise the frames where the location of the target object is not determined, and
wherein the performing probability propagation determines a plurality of paths from a starting frame of the first set of frames to each frame of the second set of frames through the remaining frames except for the starting frame, calculates a plurality of probability maps for the target object in the each frame of the second set of frames according to the determined paths, and calculates the probability map for the target object by calculating an average of the plurality of probability maps which are calculated according to each path.

2. The method as claimed in claim 1, further comprising:
updating the first set of frames where the tracking is completed by adding the selected frame to the first set of frames where the tracking is completed;
updating the second set of frames where the tracking is not completed by eliminating the selected frame from the second set of frames where the tracking is not completed; and
calculating a second probability map for the target object in each frame included in the updated second set of frames where the tracking is not completed by performing a patch matching operation between the updated first set of frames where the tracking is completed and the updated second set of frames where the tracking is not completed.

3. The method as claimed in claim 1, further comprising:
selecting a frame from an updated second set of frames where tracking is not completed based on a calculated second probability map, and determining the location of the target object in the frame selected from the updated second set of frames where the tracking is not completed.

4. The method as claimed in claim 1, wherein the determining of the location of the target object comprises determining a point having a maximum probability in the calculated probability map, and determining the determined point to be the location of the target object in the selected frame.

5. An object tracking apparatus, comprising:
at least one processor configured to implement:
a probability map calculation device configured to perform propagation of a probability from a first set of frames comprising a part of a plurality of frames where tracking of a target object is completed, among the plurality of frames, and a second set of frames comprising remaining frames where tracking of the target object is not completed to calculate a probability map for the target object in each frame of the second set of frames where the tracking of the target object is not completed;

a frame selection device configured to select a frame from the second set of frames where the tracking of the target object is not completed based on a reliability level of the calculated probability map for the selected frame; and a location determination device configured to determine a location of the target object in the selected frame, wherein the part of the plurality of frames where the tracking of the target object is completed comprises the frames where the location of the target object is determined, and the remaining frames where the tracking of the target object is not completed comprise the frames where the location of the target object is not determined, and wherein the probability map calculation device is further configured to determine a plurality of paths from a starting frame of the first set of frames to each frame of the second set of frames through the remaining frames except for the starting frame, calculate a plurality of probability maps for the target object in the each frame of the second set of frames according to the determined paths, and calculate the probability map for the target object by calculating an average of the plurality of probability maps which are calculated according to each path.

6. The apparatus as claimed in claim 5, wherein the frame selection device updates the first set of frames where the tracking of the target object is completed by adding the selected frame to the first set of frames where the tracking is completed, and updates the second set of frames where the tracking is not completed by eliminating the selected frame from the second set of frames where the tracking is not completed, and wherein the probability map calculation device calculates a probability map for the target object in each frame included in the updated second set of frames where the tracking is not completed by performing a patch matching operation between the updated first set of frames where the tracking is completed and the updated second set of frames where tracking is not completed.

7. The apparatus as claimed in claim 5, further comprising:

wherein the frame selection device selects a frame from an updated second set of frames where the tracking of the target object is not completed based on a calculated first probability map, and wherein the location determination device determines the location of the target object in the frame selected from the updated second set of frames where the tracking of the target object is not completed.

8. The apparatus as claimed in claim 5, wherein the location determination device determines a point which has a maximum probability in the calculated probability map, and determines the determined point to be the location of the target object in the selected frame.

9. A method of tracking an object, the method comprising:

inputting, by a processor, an image comprising a plurality of frames;

calculating, by the processor, a probability map for each frame of the plurality of frames where tracking of a target object is not completed by performing a propagating probability for the target object from frames of the plurality of frames where tracking of the target object is completed, to frames of the plurality of frames where tracking of the target object is not completed;

calculating, by the processor, a reliability level of the probability map for each frame of the plurality of frames where tracking of the target object is not completed, and selecting, by the processor, a frame from the set of frames where the tracking of the target object is not completed based on the calculated reliability of the probability map, wherein the frames of the plurality of frames where tracking of the target object is completed comprise frames where a location of the target object is determined, and the frame of the plurality of frames where tracking of the target object is not completed comprises a frame where the location of the target object is not determined, and wherein the calculating the probability map determines a plurality of paths from a starting frame of the frames of the plurality of frames where tracking of the target object is completed to the frame of the plurality of frames where tracking of the target object is not completed through remaining frames except for the starting frame, calculates a plurality of probability maps for the frame of the plurality of frames where tracking of the target object is not completed according to the determined paths, and calculates the probability map for the target object by calculating an average of the plurality of probability maps which are calculated according to each path.

10. The method of claim 9, wherein the location of the target object is determined from the selected frame.

11. The method of claim 10, wherein the location of the target object in the selected frame is obtained by determining a point in the calculated probability map which has a maximum probability and determining the determined point to be a point where the target object exists.

12. The method of claim 11, wherein the frames of the plurality of frames where the tracking of the target object is completed is updated by adding the selected frame to the frames where the tracking of the target object is completed.

13. The method of claim 12, wherein the frames of the plurality of frames where the tracking of the target object is not completed is updated by eliminating the selected frame from the frames where the tracking of the target object is not completed.

* * * * *